United States Patent
Deng et al.

(10) Patent No.: US 8,526,067 B2
(45) Date of Patent: Sep. 3, 2013

(54) HANDHELD PORTABLE SCANNER

(75) Inventors: Rongfang Deng, Shenzhen (CN);
Weijun Gan, Shenzhen (CN); Debin Zhang, Shenzhen (CN); Yenfeng Huang, Shenzhen (CN)

(73) Assignee: Sky Light Electronic (Shenzhen) Limited, Shenzhen (CN)

( * ) Notice: Subject to any disclaimer, the term of this patent is extended or adjusted under 35 U.S.C. 154(b) by 289 days.

(21) Appl. No.: 13/084,566

(22) Filed: Apr. 12, 2011

(65) Prior Publication Data

US 2012/0262764 A1 Oct. 18, 2012

(51) Int. Cl.
*H04N 1/04* (2006.01)

(52) U.S. Cl.
USPC ............ 358/473; 358/442; 358/498; 358/497

(58) Field of Classification Search
USPC .................................. 358/473, 442, 498, 497
See application file for complete search history.

(56) References Cited

U.S. PATENT DOCUMENTS

| | | | | |
|---|---|---|---|---|
| 4,703,186 A | * | 10/1987 | Nakayama et al. | 250/566 |
| 5,381,020 A | * | 1/1995 | Kochis et al. | 250/566 |
| 2007/0147711 A1 | * | 6/2007 | Leng | 382/313 |
| 2010/0002269 A1 | * | 1/2010 | Shen | 358/442 |

* cited by examiner

*Primary Examiner* — Houshang Safaipour

(57) ABSTRACT

The present invention relates to a scanner and more particularly pertains to a handheld portable scanner with integrated technologies which effectively combines lighting, electronics and mechanical technologies and has a small size and convenient portability, which comprises a scanner housing, a battery, scanning components and image processing components. The scanning components are composed of an optical scanning head and a scanning rod. The image processing components are composed of scan-speed testing components which are coupled with the scanning rod, a processing chip for processing of data scanned by the optical scanning head and image processing, and a scanner circuit. The present invention provides a handheld portable scanner which has a convenient portability and extensive functions. More importantly, with the coordination of the speed testing components and the processing chip, the present invention can correct scanning errors caused by uneven speed of manual scanning by means of computation of the chip, thereby ensuring that the scanning output is the same as the original document. To ensure the quality of the scanned document, reminder function is also available in case the dragging speed of the scanner is too fast.

6 Claims, 4 Drawing Sheets

HANDHELD PORTABLE SCANNER

BACKGROUND OF THE INVENTION

The present invention relates to a scanner and more particularly pertains to a handheld portable scanner with integrated technologies which effectively combines lighting, electronics and mechanical technologies and has a small size and convenient portability.

Currently, scanners in the market are of sheetfed type which scans the documents directly to computers. Scanning documents are greatly limited by the space available. The present invention is not of sheetfed type and can be directly dragged across the scanning documents; the user may adjust the scanning speed by himself, making the operation very convenient. The scanned documents would be directly saved to the internal storage device in the invention or the expansion card. The operation of scanning would neither be limited by the venue nor space.

BRIEF SUMMARY OF THE INVENTION

In view of the aforesaid disadvantages now present in the prior art, the present invention provides a handheld portable scanner.

To attain this, the present invention generally comprises the following:

A handheld portable scanner which comprises a scanner housing, a battery, scanning components and image processing components. The scanning components are composed of an optical scanning head and a scanning rod. The image processing components are composed of scan-speed testing components which are coupled with the scanning rod, a processing chip for processing of data scanned by the optical scanning head and image processing, and a scanner circuit.

The scan-speed testing components are composed of a gear set and a light sensor connected to the gear set. The gear set is driven by rotation of the scanning rod while scanning. The light sensor converts rotation speed of teeth of the gear set into a speed signal, which is transmitted to the processing chip of the scanner for processing.

Rubber rollers are disposed on the scanning rod to increase friction and guarantee dragging direction and stability while scanning.

The scanner has an internal storage device or is disposed with a slot for expansion storage devices. The user can save the scanned data to the expansion card received in the slot for expansion storage devices or the internal storage device depending on actual need. The internal storage device can co-exist with the slot for expansion storage devices.

The scanner is further disposed with slots for data wires, through which the transmission of data to computers can be realized.

The scanner housing is further disposed with an LCD screen, LED indication lights and scanner control keys.

The present invention provides a handheld portable scanner which has a convenient portability and extensive functions. More importantly, with the coordination of the speed testing components and the processing chip, the present invention can correct scanning errors caused by uneven speed of manual scanning by means of computation of the chip, thereby ensuring that the scanning output is the same as the original document. To ensure the quality of the scanned document, reminder function is also available in case the dragging speed of the scanner is too fast. The present invention also significantly increases the efficiency of scanning by changing sheetfed scanning into direct scanning. The handheld portable scanner of the present invention integrally realizes functions such as scanning of images and text, data processing and storage as well as output of images to the computer, which significantly saves the user's time and offers convenience and reliability. The present invention can also realize unlimited scanning capacity by choosing storage cards of different storage capacities (or by backing up multiple storage cards). The present handheld portable scanner saves the data of the scanning document to the internal storage device or expansion cards in digital image file format such as JPEG, TIF and so forth for direct retrieval. Scan page count and display function as well as low power reminder function are also provided.

DETAILED DESCRIPTION OF THE INVENTION

Figure 1:
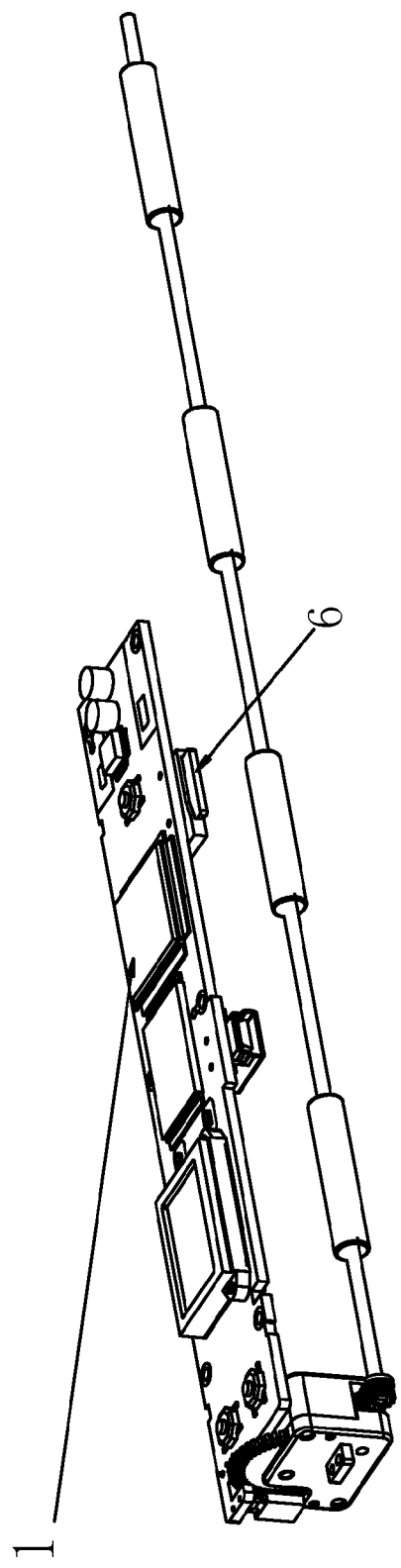
FIG. 1 shows the schematic diagram of the interior structure of the present invention.
Figure 2:
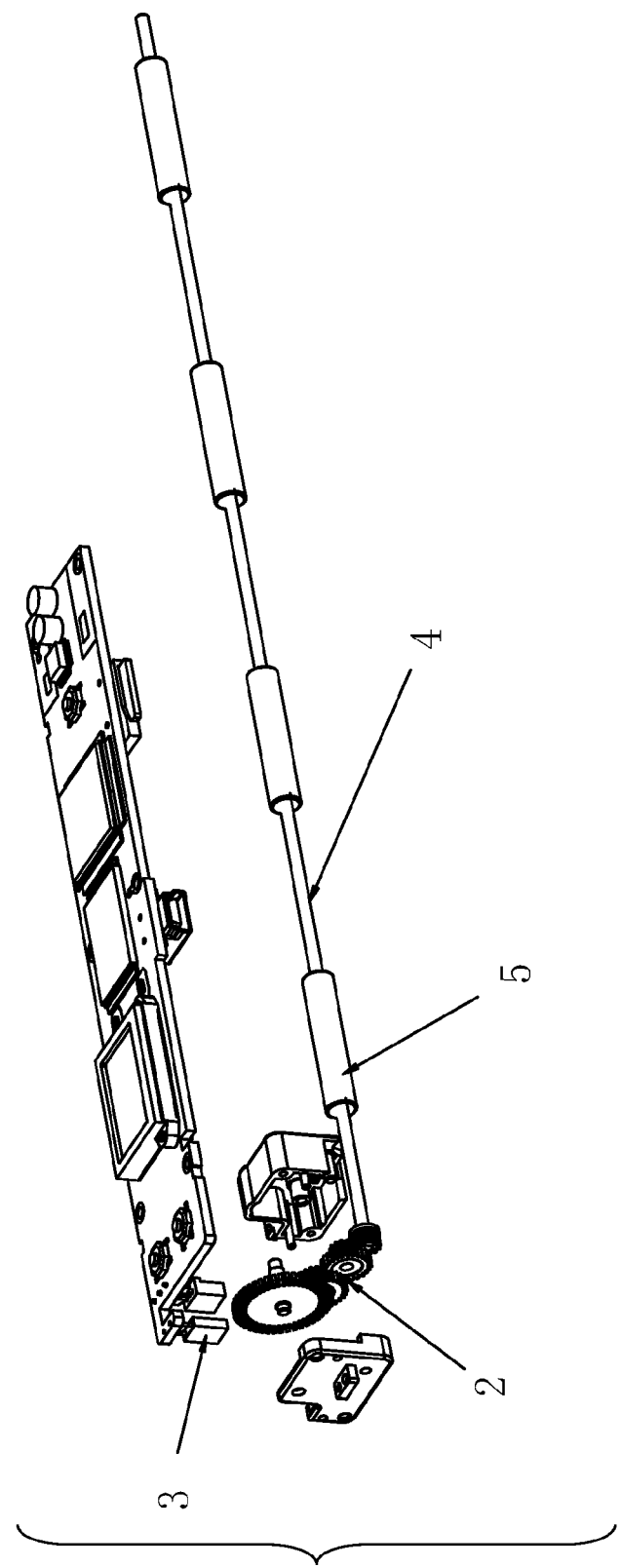
FIG. 2 shows the exploded diagram of the interior structure of the present invention.

Below is a further illustration of the present invention with reference to FIG. 1 and FIG. 2 which allows a person skilled in the art to comprehend and realize the concept of the present invention more easily.

A handheld portable scanner comprises a scanner housing, wherein an optical scanning head 7 is disposed on one side thereof. A scanning rod 4 is disposed next to the optical head 7 which is coupled with the optical scanning head 7 while scanning.

Figure 3:
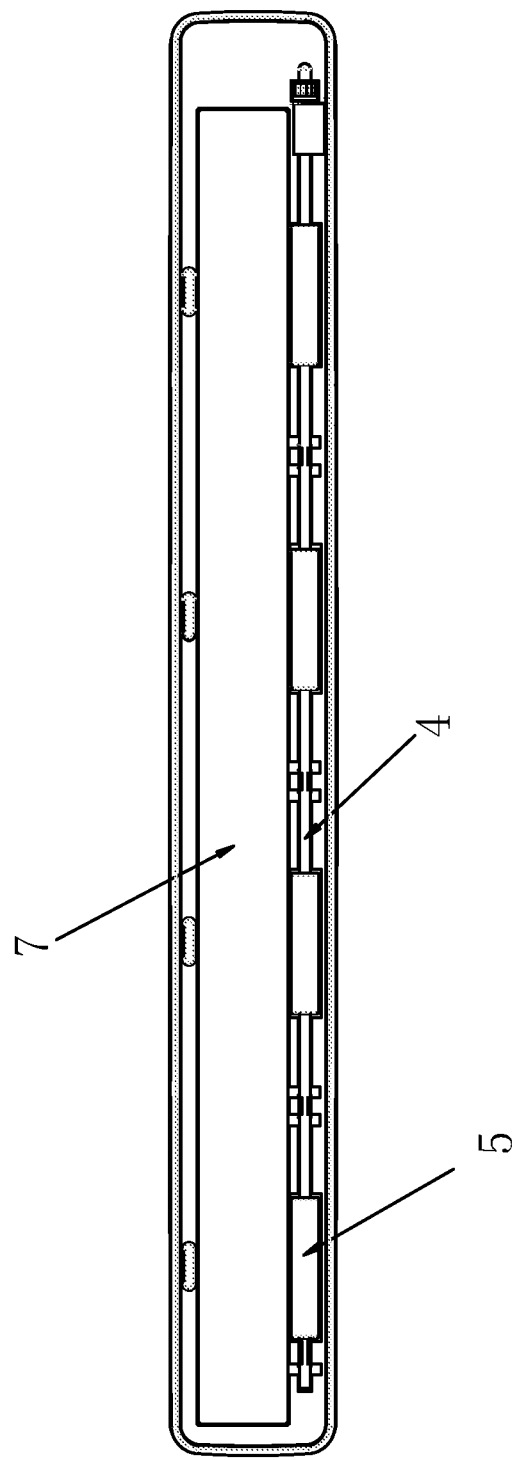
FIG. 3 shows the base structure of the present invention.

As illustrated in FIG. 3, the scanning rod 4 rotates on its own axis. Rubber rollers 5 are disposed on the rod in order to increase friction while scanning and also to guarantee the scanning direction.

The scanning rod 4 can also drive the scan-speed testing components through its rotation. The scan-speed testing components comprise a gear set 2 and a light sensor 3 for the detection of the gear set. The gear set 2 comprises a transmission gear set and a speed testing gear. Through the rotation of the scanning rod, the transmission gear set drives the speed testing gear, whose teeth are disposed in the light sensor 3 on the scanner circuit.

When the speed testing gear rotates, the light sensor 3 can sense the rotation of its teeth and thus calculates the dragging speed of the scanner. The light sensor transmits the obtained data to a processing chip (CPU) 1 for processing of data scanned by the optical scanning head and image processing. The CPU1 determines the dragging speed of the scanner and automatically adjusts the number of scanning lines to maintain the scale and quality of the scanned images.

The CPU1 of the scanner also processes the images scanned by the optical scanning head and transmits them to a storage device of the scanner after integrated processing.

The storage device of the scanner may comprise an internal storage device 6 and an expansion storage card, with the internal storage device 6 disposed on a PCBA and the expansion storage card connected to a card slot on the PCBA.

The handheld portable scanner is further disposed with slots for data wires. Through the data wires, the scanned images can be easily transmitted to the computer for use.

Figure 4:
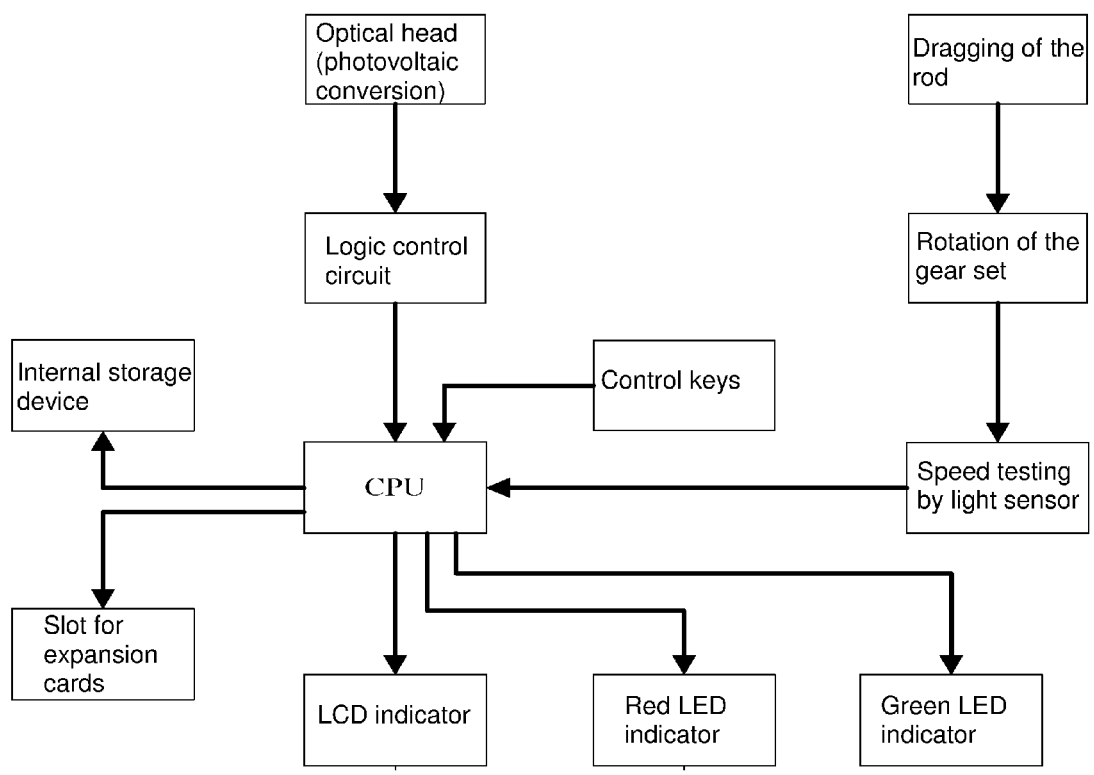
FIG. 4 shows the block diagram of the present invention.

As illustrated in FIG. 4, control keys and LED indication lights are disposed on the housing of the scanner. The LED indication lights are red and green in color respectively when turned on. When a POWER key is pressed to activate the scanner, and the Scan key is pressed (the green LED light is on), the user may drag the optical scanning head across the scanning document. When the red LED light is on, it reminds the user to slow down the dragging speed of the optical scanning head 7. When the red LED light flashes, it reminds the user that the current dragging speed of the optical head 7 is too quick; if the user does not slow down the speed, the documents obtained through scanning by the optical scanning head 7 would be deformed. Thereafter, the scanned document would be saved to the memory card.

The above is a detailed description of a handheld portable scanner provided by the present invention. The embodiments employed herein are for illustrating the structure of the present invention. The above embodiments are only for the purpose of comprehending the key concepts of the present invention; Also, modifications may be made by a person skilled in the art to the manner of operation and the scope of application according to the spirit of the present invention. In view of the above, the foregoing should not be regarded as limiting for the present invention.

What is claimed is:

1. A handheld portable scanner which comprises a scanner housing, a battery, scanning components and image processing components, characterized in that the scanning components are composed of an optical scanning head and a scanning rod; the image processing components are composed of scan-speed testing components which are coupled with the scanning rod, a processing chip for processing of data scanned by the optical scanning head and image processing, and a scanner circuit; the scan-speed testing components are composed of a gear set and a light sensor connected to the gear set the gear set is driven by rotation of the scanning rod while scanning; the light sensor converts rotation speed of teeth of the gear set into a speed signal, which is transmitted to the processing chip of the scanner for processing.

2. The handheld portable scanner as in claim 1, which is characterized in that the scanner also has an internal storage device.

3. The handheld portable scanner as in claim 1, which is characterized in that the scanner also has a slot for expansion storage cards.

4. The handheld portable scanner as in claim 1, which is characterized in that rubber rollers are also disposed on the scanning rod.

5. The handheld portable scanner as in claim 1, which is characterized in that the scanner is further disposed with slots for data wires, through which the transmission of data to computers can be realized.

6. The handheld portable scanner as in claim 1, which is characterized in that the scanner housing is further disposed with an LCD screen, LED indication lights and scanner control keys.

* * * * *